(12) United States Patent
Amari

(10) Patent No.: US 11,815,029 B2
(45) Date of Patent: Nov. 14, 2023

(54) POWER ASSISTED ENGINE START BLEED SYSTEM

(71) Applicant: RAYTHEON TECHNOLOGIES CORPORATION, Farmington, CT (US)

(72) Inventor: Martin Richard Amari, Glastonbury, CT (US)

(73) Assignee: Raytheon Technologies Corporation, Farmington, CT (US)

( * ) Notice: Subject to any disclaimer, the term of this patent is extended or adjusted under 35 U.S.C. 154(b) by 0 days.

(21) Appl. No.: 17/893,640

(22) Filed: Aug. 23, 2022

(65) Prior Publication Data

US 2023/0148411 A1    May 11, 2023

Related U.S. Application Data

(62) Division of application No. 16/654,202, filed on Oct. 16, 2019, now Pat. No. 11,454,175.

(60) Provisional application No. 62/801,296, filed on Feb. 5, 2019.

(51) Int. Cl.
| | | |
|---|---|---|
| *F02C 9/18* | (2006.01) | |
| *F04D 27/02* | (2006.01) | |
| *F02C 7/27* | (2006.01) | |
| *F02C 6/08* | (2006.01) | |
| *F02K 3/075* | (2006.01) | |

(52) U.S. Cl.
CPC .............. *F02C 9/18* (2013.01); *F04D 27/0207* (2013.01); *F04D 27/0215* (2013.01); *F04D 27/0223* (2013.01); *F02C 6/08* (2013.01); *F02C 7/27* (2013.01); *F02K 3/075* (2013.01); *F05D 2260/85* (2013.01); *F05D 2270/101* (2013.01)

(58) Field of Classification Search
CPC ..... F02C 9/18; F04D 27/0215; F04D 27/0207; F02K 3/075; F02C 6/08; F05D 2270/101; F02C 7/27; F05D 2260/85; F04D 25/16; F04D 27/023; F04D 27/0223; F02C 3/13; F02C 7/26
See application file for complete search history.

(56) References Cited

U.S. PATENT DOCUMENTS

| | | | | |
|---|---|---|---|---|
| 5,363,641 | A | * 11/1994 | Dixon et al. | ............. F02C 6/08 60/788 |
| 6,305,156 | B1 | * 10/2001 | Lui | ....................... B64D 13/06 60/788 |
| 9,810,158 | B2 | 11/2017 | Foutch et al. | |

(Continued)

FOREIGN PATENT DOCUMENTS

CN          207161216 U     3/2018

OTHER PUBLICATIONS

European Patent Office, European Search Report dated Jul. 10, 2020 in Application No. 20152032.7.

(Continued)

*Primary Examiner* — Gerald L Sung
*Assistant Examiner* — Rene D Ford
(74) *Attorney, Agent, or Firm* — SNELL & WILMER L.L.P.

(57) ABSTRACT

A system for bleeding air from a core flow path of a gas turbine engine is disclosed. In various embodiments, the system includes a bleed valve having a bleed valve inlet configured to receive a bleed air from a first access point to the core flow path and a bleed valve outlet; and an air motor having a first air motor inlet configured to receive the bleed air from the bleed valve outlet and a first air motor outlet configured to exhaust the bleed air, the air motor configured to pump the bleed air from the core flow path of the gas turbine engine.

11 Claims, 3 Drawing Sheets

(56) References Cited

U.S. PATENT DOCUMENTS

| | | |
|---|---|---|
| 9,879,610 B2 | 1/2018 | Moes |
| 10,954,865 B2 | 3/2021 | Mackin |
| 2014/0250898 A1 | 9/2014 | Mackin et al. |
| 2016/0305346 A1 | 10/2016 | Kawai |
| 2017/0241340 A1 | 8/2017 | Feulner |
| 2017/0268423 A1 | 9/2017 | Schwarz |
| 2017/0363099 A1 | 12/2017 | Taylor et al. |
| 2018/0009536 A1 | 1/2018 | Christopherson et al. |
| 2018/0163627 A1 | 6/2018 | Suciu et al. |

OTHER PUBLICATIONS

USPTO; First Office Action dated Mar. 1, 2022 in U.S. Appl. No. 16/654,202.

USPTO; Notice of Allowance dated Jun. 21, 2022 in U.S. Appl. No. 16/654,202.

USPTO; Pre-Interview First Office Action dated Sep. 22, 2021 in U.S. Appl. No. 16/654,202.

\* cited by examiner

POWER ASSISTED ENGINE START BLEED SYSTEM

CROSS REFERENCE TO RELATED APPLICATIONS

This application is a divisional of, claims priority to and the benefit of U.S. Pat. Application No. 16/654,202 filed Oct. 16, 2019, entitled "POWER ASSISTED ENGINE START BLEED SYSTEM." The '202 application claims priority to and the benefit of U.S. Provisional Application Serial No. 62/801,296 filed Feb. 5, 2019, entitled "POWER ASSISTED ENGINE START BLEED SYSTEM." All of which are hereby incorporated by reference in their entirety for all purposes.

GOVERNMENT LICENSE RIGHTS

This invention was made with Government support awarded by the United States. The Government has certain rights in this invention.

FIELD

The present disclosure relates generally to gas turbine engines and, more particularly, to apparatus and methods used to assist start-up of gas turbine engines.

BACKGROUND

Gas turbine engines, such as those used to power modern commercial and military aircraft, typically include a fan section, a compressor section, a combustor section and a turbine section. During operation, air is pressurized in the compressor section and mixed with fuel and burned in the combustor section to generate hot combustion gases. The hot combustion gases are then communicated through the turbine section, which extracts energy from the gases to power the compressor section, the fan section and various other loads occurring within or proximate the gas turbine engine. Many engine configurations split the compressor section and the turbine section into high pressure and speed sections and low pressure and speed sections, each having blades mounted on respective high speed and low speed spools. A typical engine core flow path extends sequentially through the low compressor section, the high compressor section, the combustor section, the high turbine section and the low turbine section.

At start-up, the turbine section of the gas turbine engine has not begun to fully provide power. Thus, driving the compressor section may be more challenging than it will generally be at steady state or design conditions. Accordingly, gas turbine engines may include one or more bleed valves to bleed air away from the core flow path at the compressor section during start-up and thereby reduce the load required to drive the compressor.

SUMMARY

A system for bleeding air from a core flow path of a gas turbine engine is disclosed. In various embodiments, the system includes a bleed valve having a bleed valve inlet configured to receive a bleed air from a first access point to the core flow path and a bleed valve outlet; and an air motor having a first air motor inlet configured to receive the bleed air from the bleed valve outlet and a first air motor outlet configured to exhaust the bleed air, the air motor configured to pump the bleed air from the core flow path of the gas turbine engine.

In various embodiments, a second air motor inlet is configured to receive a pressurized air from a pressurized air source and a second air motor outlet is configured to exhaust the pressurized air and the first access point to the core flow path is positioned proximate a compressor section of the gas turbine engine. In various embodiments, the compressor section includes a high pressure section and a low pressure section and the first access point to the core flow path is positioned proximate the high pressure section. In various embodiments, the first access point to the core flow path is positioned proximate a first downstream stage of the high pressure section. In various embodiments, the pressurized air source is positioned proximate a second downstream stage that is located downstream of the first downstream stage.

In various embodiments, the first air motor outlet is configured to exhaust the bleed air to a bypass flow path of the gas turbine engine. In various embodiments, the second air motor outlet is configured to exhaust the pressurized air to the bypass flow path of the gas turbine engine.

In various embodiments, the pressurized air source comprises an external pneumatic source. In various embodiments, the external pneumatic source includes at least one of an auxiliary power unit and a ground power unit.

In various embodiments, the air motor includes an air motor compressor section and an air motor turbine section. In various embodiments, the first air motor inlet is configured to deliver the bleed air to the air motor compressor section and the second air motor inlet is configured to deliver the pressurized air to the air motor turbine section.

In various embodiments, the first access point to the core flow path is positioned proximate a core flow path compressor section of the gas turbine engine. In various embodiments, the first access point to the core flow path is positioned proximate a first downstream stage of a high pressure section of the core flow path compressor section. In various embodiments, the pressurized air source is positioned proximate a second downstream stage of the high pressure section of the core flow path compressor section that is located downstream of the first downstream stage. In various embodiments, the air motor is driven by a pressurized air source or an electric motor.

A gas turbine engine is disclosed. In various embodiments, the gas turbine engine includes a compressor section, a combustor section and a turbine section configured to provide for a core flow path extending through the gas turbine engine; a bleed valve having a bleed valve inlet configured to receive a bleed air from a first access point to the core flow path and a bleed valve outlet; and an air motor having a first air motor inlet configured to receive the bleed air from the bleed valve outlet and a first air motor outlet configured to exhaust the bleed air, the air motor configured to pump the bleed air from the core flow path of the gas turbine engine.

In various embodiments, a second air motor inlet is configured to receive a pressurized air from a pressurized air source and a second air motor outlet is configured to exhaust the pressurized air, the compressor section includes a high pressure section and a low pressure section and the first access point to the core flow path is positioned proximate a first downstream stage of the high pressure section. In various embodiments, the pressurized air source is positioned proximate a second downstream stage that is located downstream of the first downstream stage.

In various embodiments, the air motor includes an air motor compressor section and an air motor turbine section, wherein the first air motor inlet is configured to deliver the bleed air to the air motor compressor section and the second air motor inlet is configured to deliver the pressurized air to the air motor turbine section, and wherein the first air motor outlet is configured to exhaust the bleed air to a bypass flow path of the gas turbine engine and the second air motor outlet is configured to exhaust the pressurized air to the bypass flow path.

A method of starting a gas turbine engine having a core flow path compressor section, a combustor section and a core flow path turbine section configured to provide for a core flow path extending through the gas turbine engine is disclosed. In various embodiments, the method includes the steps of rotating the core flow path compressor section and the core flow path turbine section; opening a first access point to the core flow path to direct a bleed air from the core flow compressor section to an air motor compressor section of an air motor; directing a pressurized air from a pressurized air source to an air motor turbine section of the air motor; driving the air motor turbine section using the pressurized air to drive the air motor compressor section to pump the bleed air from the first access point; and igniting the combustor section.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the following detailed description and claims in connection with the following drawings. While the drawings illustrate various embodiments employing the principles described herein, the drawings do not limit the scope of the claims.

DETAILED DESCRIPTION

The following detailed description of various embodiments herein makes reference to the accompanying drawings, which show various embodiments by way of illustration. While these various embodiments are described in sufficient detail to enable those skilled in the art to practice the disclosure, it should be understood that other embodiments may be realized and that changes may be made without departing from the scope of the disclosure. Thus, the detailed description herein is presented for purposes of illustration only and not of limitation. Furthermore, any reference to singular includes plural embodiments, and any reference to more than one component or step may include a singular embodiment or step. Also, any reference to attached, fixed, connected, or the like may include permanent, removable, temporary, partial, full or any other possible attachment option. Additionally, any reference to without contact (or similar phrases) may also include reduced contact or minimal contact. It should also be understood that unless specifically stated otherwise, references to "a," "an" or "the" may include one or more than one and that reference to an item in the singular may also include the item in the plural. Further, all ranges may include upper and lower values and all ranges and ratio limits disclosed herein may be combined.

Figure 1:
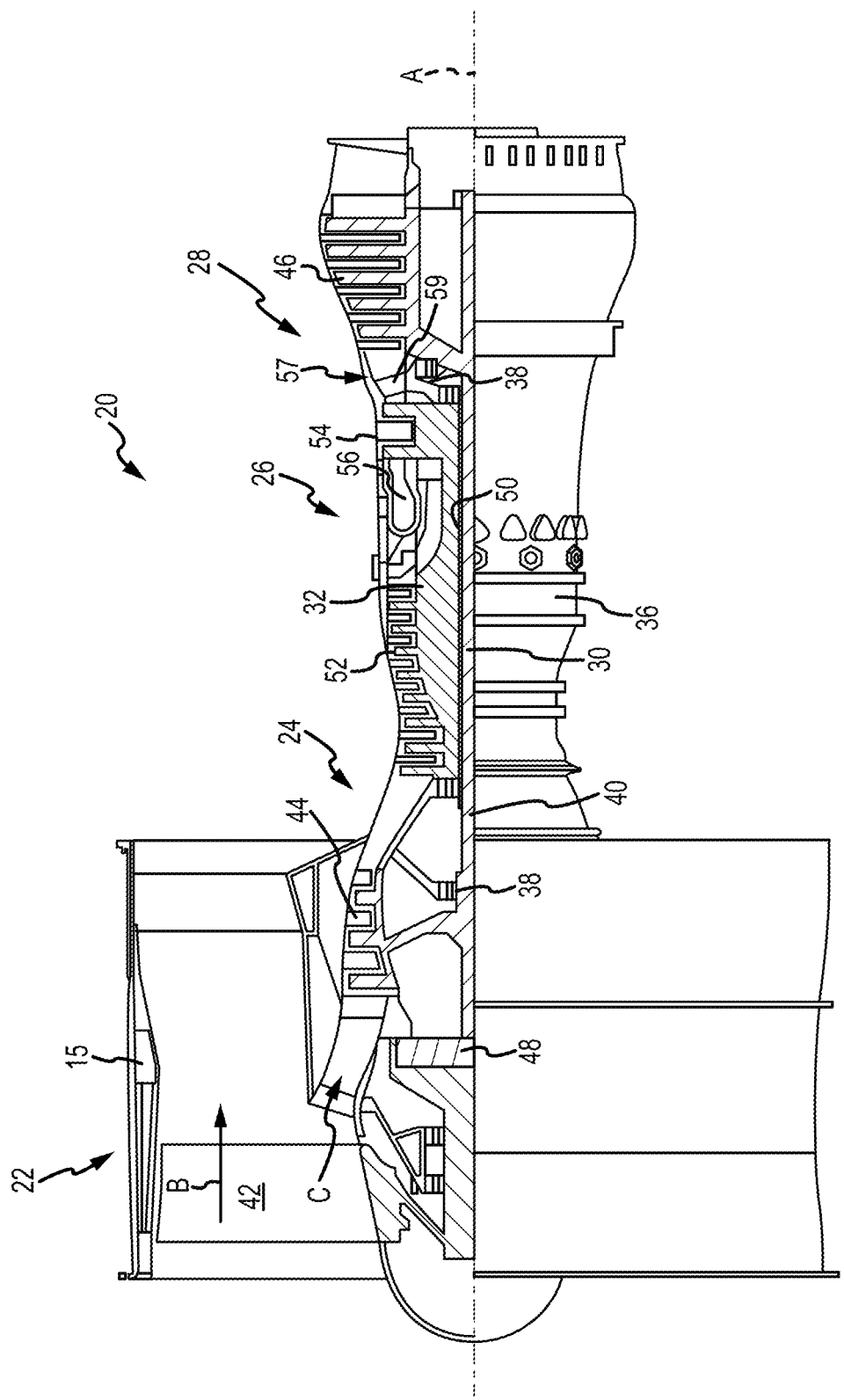
FIG. 1 is a schematic view of a gas turbine engine, in accordance with various embodiments.

Referring now to the drawings, FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. The fan section 22 drives air along a bypass flow path B in a bypass duct defined within a nacelle 15, while the compressor section 24 drives air along a core or primary flow path C for compression and communication into the combustor section 26 and then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines.

The gas turbine engine 20 generally includes a low speed spool 30 and a high speed spool 32 mounted for rotation about an engine central longitudinal axis A relative to an engine static structure 36 via several bearing systems 38. It should be understood that various bearing systems at various locations may alternatively or additionally be provided and the location of the several bearing systems 38 may be varied as appropriate to the application. The low speed spool 30 generally includes an inner shaft 40 that interconnects a fan 42, a low pressure compressor 44 and a low pressure turbine 46. The inner shaft 40 is connected to the fan 42 through a speed change mechanism, which in this gas turbine engine 20 is illustrated as a fan drive gear system 48 configured to drive the fan 42 at a lower speed than the low speed spool 30. The high speed spool 32 includes an outer shaft 50 that interconnects a high pressure compressor 52 and a high pressure turbine 54. A combustor 56 is arranged in the gas turbine engine 20 between the high pressure compressor 52 and the high pressure turbine 54. A mid-turbine frame 57 of the engine static structure 36 is arranged generally between the high pressure turbine 54 and the low pressure turbine 46 and may include airfoils 59 in the core flow path C for guiding the flow into the low pressure turbine 46. The mid-turbine frame 57 further supports the several bearing systems 38 in the turbine section 28. The inner shaft 40 and the outer shaft 50 are concentric and rotate via the several bearing systems 38 about the engine central longitudinal axis A, which is collinear with longitudinal axes of the inner shaft 40 and the outer shaft 50.

The air in the core flow path C is compressed by the low pressure compressor 44 and then the high pressure compressor 52, mixed and burned with fuel in the combustor 56, and then expanded over the high pressure turbine 54 and low pressure turbine 46. The low pressure turbine 46 and the high pressure turbine 54 rotationally drive the respective low speed spool 30 and the high speed spool 32 in response to the expansion. It will be appreciated that each of the positions of the fan section 22, the compressor section 24, the combustor section 26, the turbine section 28, and the fan drive gear system 48 may be varied. For example, the fan drive gear system 48 may be located aft of the combustor section 26 or even aft of the turbine section 28, and the fan section 22 may be positioned forward or aft of the location of the fan drive gear system 48.

Figure 2:
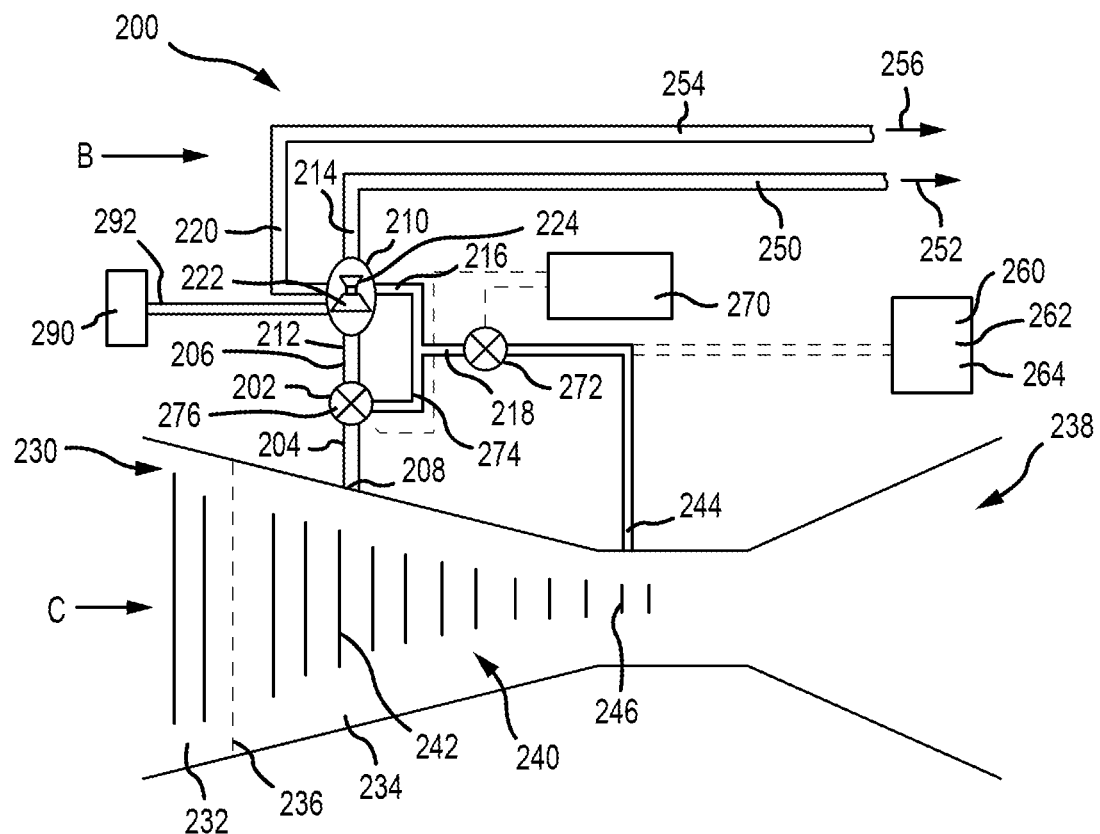
FIG. 2 is a schematic view of a power assisted bleed system, in accordance with various embodiments.

Referring now to FIG. 2, a schematic view of a system 200 for bleeding air from a core flow path C of a gas turbine engine, such as, for example, the gas turbine engine 20 described above with reference to FIG. 1, is provided. In various embodiments, the system 200 includes a bleed valve 202 having a bleed valve inlet 204 and a bleed valve outlet 206. The bleed valve inlet 204 is configured to receive a bleed air from a first access point 208 to the core flow path C. The system 200 further includes an air motor 210. In various embodiments, the air motor 210 includes a first air motor inlet 212 configured to receive the bleed air from the bleed valve outlet 206 and a first air motor outlet 214 configured to exhaust the bleed air. The air motor 210 may further include a second air motor inlet 216 configured to receive a pressurized air from a pressurized air source 218 and a second air motor outlet 220 configured to exhaust the pressurized air. While the air motor 210 and the bleed valve 202 are described herein as comprising separate components, the disclosure contemplates incorporation of both components into a single unit.

In various embodiments, the air motor 210 includes an air motor compressor section 222 and an air motor turbine section 224. In various embodiments, the first air motor inlet 212 is configured to deliver the bleed air to the air motor compressor section 222 and the second air motor inlet 216 is configured to deliver the pressurized air to the air motor turbine section 224. With such an arrangement, the pressurized air may be used to drive the air motor turbine section 224 which, in turn, drives the air motor compressor section 222. In various embodiments, driving the air motor compressor section 222 serves to pump the bleed air from the first air motor inlet 212 (or from the first access point 208 to the core flow path C) to the first air motor outlet 214.

In various embodiments, the first access point 208 to the core flow path is positioned proximate a core flow path compressor section 230 of the gas turbine engine. In various embodiments, the core flow path compressor section 230 includes a low pressure section 232 and a high pressure section 234 positioned downstream of the low pressure section 232. Schematically, the low pressure section 232 and the high pressure section 234 may be separated by a dividing line 236 and are each connected, respectively, to corresponding low and high pressure sections of a core air flow path turbine section 238 via corresponding low and high speed spools. In various embodiments, the core flow path compressor section 230 may include one or more compressor stages 240 (each stage including a rotor section and a stator section).

In various embodiments, the first access point 208 to the core flow path C is positioned proximate a first downstream stage 242 of the high pressure section 234 of the core flow path compressor section 230. In various embodiments, the pressurized air source 218 is configured to receive the pressurized air from a second access point 244 to the core flow path C positioned proximate a second downstream stage 246 of the high pressure section 234 of the core flow path compressor section 230. In various embodiments, the second downstream stage 246 is located downstream of the first downstream stage 242 and, thus, contains pressurized air at a higher pressure than is the first downstream stage 242 of the high pressure section 234.

In various embodiments, the first air motor outlet 214 is configured to exhaust the bleed air to a bypass flow path B of the gas turbine engine. In similar fashion, the second air motor outlet 220 may be configured to exhaust the pressurized air to the bypass flow path B of the gas turbine engine. In various embodiments, the bleed air may be exhausted to the bypass flow path B via a first conduit 250 configured to expel a bleed air stream 252 and the pressurized air may be exhausted to the bypass flow path B via a second conduit 254 configured to expel a pressurized air stream 256.

While the foregoing describes the pressurized air source 218 as being configured to receive the pressurized air from a second access point 244 to the core flow path C, the disclosure also contemplates the pressurized air source 218 being configured to receive the pressurized air from an external pneumatic source 260. In various embodiments, for example, the external pneumatic source may comprise one or more of an auxiliary power unit 262 (e.g., an APU positioned on an aircraft) and a ground power unit 264, which may also comprise an auxiliary power unit. In addition, while the foregoing describes use of a pressurized air to drive the air motor 210, thereby pumping the bleed air from the first air motor inlet 212 (or from the first access point 208 to the core flow path C) to the first air motor outlet 214, the disclosure contemplates driving the air motor 210 using an electric motor 290 which, in various embodiments, may be coupled to the air motor compressor section 222 either directly or via a shaft 292. Stated otherwise, the air motor turbine section 224 may be replaced by the electric motor 290. Further, in various embodiments, use of the electric motor 290 to drive the air motor compressor section 222 may obviate the need for the pressurized air source 218, the second air motor inlet 216, the second air motor outlet 220 and the accompanying conduits for transporting the pressurized air to drive the air motor 210 (the air motor compressor section 222). Alternatively, in various embodiments, the electric motor 290 and the pressurized air source 218 may be used in conjunction with one another to drive the air motor 210, thereby driving the air motor compressor section 222 to pump bleed air from the compressor section during start-up of the engine.

In various embodiments, the system 200 may include a controller 270, such as, for example, a full authority digital engine control (FADEC). The FADEC may be configured, for example, to control opening and closing of the bleed valve 202 and to control opening and closing of a pressurized air valve 272. In various embodiments, the FADEC may control opening and closing of the pressurized air valve 272, whereby the pressurized air may be conveyed to the bleed valve 202 via a conduit 274 and then used to activate a pressure sensor 276 that is used to control opening and closing of the bleed valve 202. In various embodiments, the conduit 274 may be replaced by an electrical line configured to carry a charge or data used to trigger a solenoid configured to open and close the bleed valve 202.

Figure 3:
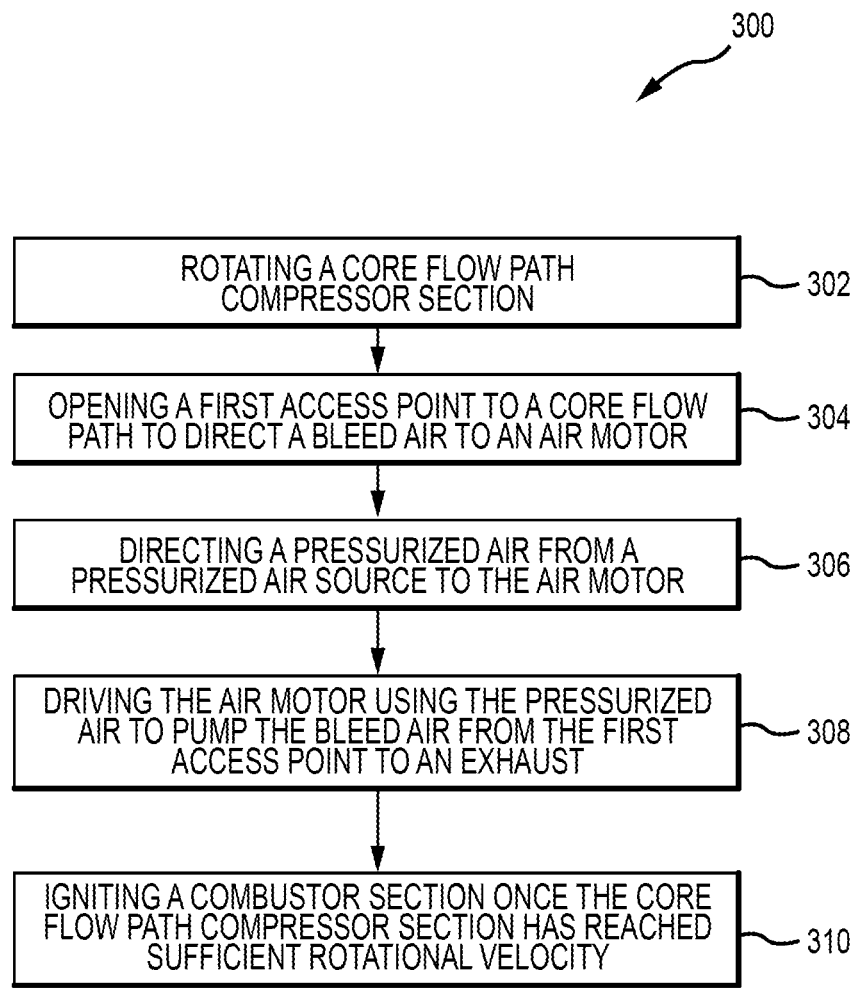
FIG. 3 described a method of starting a gas turbine engine, in accordance with various embodiments.

Referring now to FIG. 3, a method 300 of starting a gas turbine engine is disclosed. In various embodiments, the gas turbine engine has a core flow path compressor section, a combustor section and a core flow path turbine section configured to provide for a core flow path C extending through the gas turbine engine. In various embodiments, the method 300 includes a first step 302 of rotating the core flow path compressor section and the core flow path turbine section. The rotation may be accomplished, in various embodiments, by a starter motor or the like. A second step 304 includes opening a first access point to the core flow path C to direct a bleed air from the core flow compressor section to an air motor compressor section of an air motor. A third step 306 includes directing a pressurized air from a pressurized air source to an air motor turbine section of the air motor. A fourth step 308 includes driving the air motor turbine section using the pressurized air to drive the air motor compressor section to pump the bleed air from the first access point to an exhaust. A fifth step 310 includes igniting the combustor section once the core flow path compressor section and the core flow path turbine section have reached sufficient rotational velocity.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Systems, methods and apparatus are provided herein. In the detailed description herein, references to "one embodiment," "an embodiment," "various embodiments," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f) unless the element is expressly recited using the phrase "means for." As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

Finally, it should be understood that any of the above described concepts can be used alone or in combination with any or all of the other above described concepts. Although various embodiments have been disclosed and described, one of ordinary skill in this art would recognize that certain modifications would come within the scope of this disclosure. Accordingly, the description is not intended to be exhaustive or to limit the principles described or illustrated herein to any precise form. Many modifications and variations are possible in light of the above teaching.

What is claimed:

1. A method of starting a gas turbine engine having a core flow path compressor section, a combustor section and a core flow path turbine section configured to provide for a core flow path extending through the gas turbine engine, comprising:
   igniting the combustor section after performing the following steps:
      rotating the core flow path compressor section and the core flow path turbine section;
      opening a first access point to the core flow path to direct a bleed air from the core flow compressor section to an air motor compressor section of an air motor;
      directing a pressurized air from a pressurized air source to an air motor turbine section of the air motor; and
      driving the air motor turbine section using the pressurized air to drive the air motor compressor section to pump the bleed air from the first access point.

2. The method of claim 1, further comprising:
   receiving the pressurized air by a first air motor inlet; and
   exhausting the pressurized air at a first air motor outlet, wherein the first access point to the core flow path is positioned proximate the core flow path compressor section of the gas turbine engine.

3. The method of claim 2, wherein the core flow path compressor section includes a high pressure section and a low pressure section, the first access point to the core flow path positioned proximate the high pressure section.

4. The method of claim 3, wherein the first access point to the core flow path is positioned proximate a first downstream stage of the high pressure section.

5. The method of claim 4, further comprising:
   exhausting the bleed air at a second air motor outlet including exhausting the bleed air to a bypass flow path of the gas turbine engine.

6. The method of claim 5, further including:
   exhausting the pressurized air at the first air motor outlet to the bypass flow path of the gas turbine engine.

7. The method of claim 2, wherein the pressurized air source comprises an external pneumatic source.

8. The method of claim 7, wherein the external pneumatic source includes at least one of an auxiliary power unit and a ground power unit.

9. The method of claim 2, further comprising:
   delivering at a second air motor inlet the bleed air to the air motor compressor section; and
   delivering at the first air motor inlet the pressurized air to the air motor turbine section.

10. The method of claim 9, wherein the first access point to the core flow path is positioned proximate a first downstream stage of a high pressure section of the core flow path of the compressor section.

11. The method of claim 1, further comprising:
    driving the air motor is driven by an electric motor.

* * * * *